(12) United States Patent
Schluper

(10) Patent No.: US 12,160,173 B2
(45) Date of Patent: Dec. 3, 2024

(54) CIRCUIT FOR USE IN VOLTAGE SUPPLY FOR AN ELECTRICAL DEVICE AND CORRESPONDING USE

(71) Applicant: Robert Bosch GmbH, Stuttgart (DE)

(72) Inventor: Luc Schluper, Selfkang (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 17/834,302

(22) Filed: Jun. 7, 2022

(65) Prior Publication Data

US 2022/0393598 A1 Dec. 8, 2022

(30) Foreign Application Priority Data

Jun. 7, 2021 (EP) ..................................... 21177967

(51) Int. Cl.
*H02M 3/335* (2006.01)
*H02J 9/06* (2006.01)
(Continued)

(52) U.S. Cl.
CPC ......... *H02M 3/33507* (2013.01); *H02J 9/061* (2013.01); *H02M 3/158* (2013.01); *H04L 12/10* (2013.01)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 8,085,013 B2 * 12/2011 Wei .......................... H02J 1/102
323/272
8,400,794 B2 * 3/2013 Liu ........................... H02J 1/10
323/272
(Continued)

FOREIGN PATENT DOCUMENTS

WO 2013017150 A1 2/2013
WO 2016149549 A1 9/2016

*Primary Examiner* — Jeffrey A Gblende
(74) *Attorney, Agent, or Firm* — Michael Best & Friedrich LLP

(57) ABSTRACT

A circuit (100) for use in voltage supply for an electrical device, having a first input (111) configured for connecting with a first voltage source, a second input (121) configured for connecting with a second voltage source, and a common output (133) configured for connecting with an input of the electrical device, comprising a first voltage converter (110) with an input connected to or being the first input (111), and configured to provide DC voltage at a first voltage level ($V_1$) at an output (113), further comprising a second voltage converter (120) with an input connected to or being the second input (121), and configured to provide DC voltage at a second voltage level ($V_2$) at an output (123), wherein the second voltage converter (120) is configured not to operate when a voltage level present at its output (123) is higher than a stop threshold, and to operate when a voltage level present at its output (123) is lower than a start threshold, the stop threshold is equal to or higher than the second voltage level ($V_2$) and lower than the first voltage level ($V_1$), and the start threshold is equal to or lower than the second voltage level ($V_2$).

12 Claims, 3 Drawing Sheets

(51) Int. Cl.
*H02M 3/158* (2006.01)
*H04L 12/10* (2006.01)

(58) Field of Classification Search
CPC .............. H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02M 3/22; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/155; H02M 1/4233; H02M 1/12; H02M 3/07; H02M 7/219; H02M 7/4815; H02M 1/0048; H02M 7/4818; H02M 7/4826; H02J 3/46; H02J 3/38; Y02B 70/1491

See application file for complete search history.

(56) References Cited

U.S. PATENT DOCUMENTS

| | | | | |
|---|---|---|---|---|
| 9,337,724 | B2* | 5/2016 | Miller | H02M 3/073 |
| 9,419,431 | B2* | 8/2016 | Prexl | H02M 3/158 |
| 9,812,961 | B2* | 11/2017 | Shen | H02M 3/158 |
| 10,644,580 | B2* | 5/2020 | Nagamatsu | H02M 3/07 |
| 11,539,286 | B2* | 12/2022 | Hsu | H02M 1/36 |
| 2014/0084691 | A1 | 3/2014 | Ranzato et al. | |
| 2018/0367043 | A1 | 12/2018 | Dotson | |

* cited by examiner

CIRCUIT FOR USE IN VOLTAGE SUPPLY FOR AN ELECTRICAL DEVICE AND CORRESPONDING USE

BACKGROUND OF THE INVENTION

The present invention relates to a circuit for use in voltage supply for an electrical device like a surveillance camera, the circuit having two inputs for two voltage sources and a common output for the electrical device, and a use of such circuit with such electrical device like a surveillance camera.

Surveillance cameras are, for example, used in surveillance networks for observing areas of public places, schools, universities, private households, prisons etc. Usually, such a surveillance network comprises a plurality of cameras and a surveillance control center, whereby the cameras are connected with the surveillance control center by public or private network, so that images captured by the cameras can be transferred to the surveillance control center. A respective camera is, for example, disclosed in WO 2013/017150 A1.

SUMMARY OF THE INVENTION

The present invention relates to the voltage or power supply for electrical devices like (surveillance) cameras (also known as closed-circuit television, CCTV, cameras or video surveillance cameras). Such cameras are typically supplied with voltage or (electrical) power via a power supply or via Power over Ethernet (PoE, i.e., the Ethernet connection is used for power supply and for network connection). In addition, back-up voltage supplies like batteries are typically used in order to provide voltage or power in case the primary voltage supply (like PoE) is—for whatsoever reason—disconnected. A major issue in such case is that voltage should continuously be supplied to the electrical device; in other words, a seamless transition from the primary to the back-up voltage source and vice versa is desired. A reason for that desired behavior is that such electrical device like a camera would restart or reboot in case of an—even short—voltage drop. Surveillance, for example, would then be interrupted.

A way to achieve that is using a multiplexer receiving both voltage sources (each fed over a voltage converter) at inputs and providing the desired one to an output and, thus, the electrical device. However, such multiplexer is quite complex and difficult to implement. Also, a voltage drop over the multiplexer occurs; this results in dissipation.

In view of this background, a circuit (electrical circuit) for use in voltage supply for an electrical device like a (surveillance) camera is proposed. The circuit has a first input configured for connecting with a first voltage source like the primary voltage or power supply (e.g., PoE), a second input configured for connecting with a second voltage source like a back-up voltage supply (e.g., a battery), and a common output configured for connecting with the electrical device (in particular, an input or internal input of the electrical device). The circuit might be part of or integrated into the electrical device.

The circuit further comprises a first and a second voltage converter. The first voltage converter is, preferably, a fly-back converter and the second voltage converter is, preferably, a buck (or step-down) converter.

A fly-back converter can be used in both AC/DC and DC/DC conversion with galvanic isolation between the input and any outputs. The fly-back converter is a buck-boost converter with the inductor split to form a transformer, so that the voltage ratios are multiplied with an additional advantage of isolation. During operation, the converter is switched via a switch between two states or configurations. In the on-state, the energy is transferred from the input voltage source to the transformer (the output capacitor supplies energy to the output load). In the off-state, the energy is transferred from the transformer to the output load (and the output capacitor). In other words, the converter oscillates. A controller is typically provided to open and close the switch (typically the switch is a transistor) accordingly.

A buck converter (or step-down converter) is a DC-to-DC power converter which steps down voltage (while drawing less average current) from its input (supply) to its output (load). It is a class of switched-mode power supply (SMPS) typically containing at least two semiconductors (a diode and a transistor, although modern buck converters frequently replace the diode with a second transistor used for synchronous rectification) and at least one energy storage element, a capacitor, inductor, or the two in combination. To reduce voltage ripple, filters made of capacitors (sometimes in combination with inductors) are normally added to such a converter's output (load-side filter) and input (supply-side filter). During operation, the converter is switched (via a switch) between two states or configurations, an on-state and an off-state. In other words, the converter oscillates. A controller is typically provided to open and close the switch (typically the switch is a transistor) accordingly.

The first voltage converter has an input, which is connected to the first input of the (entire) circuit or which also might be identical with the first input. Further, the first voltage converter is configured to provide DC voltage at a first voltage level at a respective output. The second voltage converter has an input, which is connected to the second input of the (entire) circuit or which also might be identical with the second input. In addition, the second voltage converter is configured to provide DC voltage at a second voltage level at a respective output.

Both outputs, the output of the first voltage converter and the output of the second voltage converter, are connected to each other and to the common output. Typically, the connection to each other can be realized when connecting each of the outputs to the common output. No multiplexer or similar is required.

Note that when the term output is used, a (positive) output contact is referred to, at which a certain voltage level is present, relative to a (negative) contact or ground. The same holds true for the term input.

Further, the second voltage converter is configured to stop operating and/or to stop providing the DC voltage at a second voltage level at the output when a voltage level present at its output is higher than a stop threshold. Further, the second voltage converter is configured to start operating and/or to provide the DC voltage at a second voltage level at the output when a voltage level present at its output is decreased (from above to) below a start threshold. Preferably, the second voltage converter is also configured to stop operating when a voltage level present at its output is increased (from below to) above the stop threshold. Generally, the second voltage converter is configured not to operate when the voltage level present at its output is higher than the stop threshold, and to operate when the voltage level present at its output is lower than the start threshold.

The first voltage level is higher than the second voltage level, the stop threshold is equal to or higher than the second voltage level and lower than the first voltage level, and the start threshold is equal to or lower than the second voltage level. Both start and stop threshold can be equal to the second voltage level. For example, the first voltage level can be 5.1 V (or anything between 5.0 V and 5.3 V) and the second voltage level can be 4.9 V (or anything between 4.7 V and 5.0V). This allows voltage supply for an electrical device that typically requires 5 V. The start threshold can also be set to 4.9 V. The difference between the first and second voltage level can be, for example, up to 500 mV (0.5 V), typically depending on what the load accepts as minimum and maximum operating voltage level of, e.g., 5 V level (note, these 5 V are a nominal value and deviations are typically allowed). A minimum difference between first and second voltage level (e.g., 0.1 V to 0.15 V) typically depends on the applied second voltage converter.

This allows smooth and seamless transition from the first voltage supply to the second voltage supply and vice versa. With the first and second voltage supply connected, the first voltage level of, e.g., 5.1 V pulls the output voltage of the second voltage converter (the voltage present at the output of the second voltage convert) above the reference voltage (the second voltage level or stop threshold) of, e.g., 4.9 V. The second voltage converter (or a controller included therein, which controller is used to open and close the switch of the converter mentioned before) detects such higher output voltage (i.e., the voltage at the output of the second voltage converter is monitored) and decreases (or sets) the duty cycle of its oscillation to zero because the output voltage is above the threshold. In other words, the second voltage converter stops operating—and also does not operate as long as the voltage at its output is too high. This is a steady state of such 4.9 V back-up controller.

For example, the second voltage converter includes a feedback input (pin) at which the output voltage of the second voltage converter is fed back and can be measured or determined. With too high voltage at that feedback input, the output may be disabled or switched off. For further and more detailed explanation, refer to the drawings.

The voltage to the load (the electrical device) is 5.1 V DC now. If then the first or primary voltage supply is disconnected, the voltage at the output of the first voltage converter is decreasing from 5.1 V. At 4.9 V, the second voltage converter immediately starts to oscillate (or operate) to keep the output voltage at 4.9 V DC. There will be no lower output voltage than 4.9 V.

When the first or primary voltage supply is connected again, the voltage at the output of the first voltage converter is increasing. As soon as the voltage exceeds 4.9 V the back-up controller (the second voltage converter) immediately stops operating because the output voltage (the voltage level present at its output) is too high again. The output voltage still increases to 5.1 V DC. Also here, a smooth change to 5.1 V is seen under all load circumstances (small and heavy load).

Preferably, the circuit further comprises an electronic element upstream the output of the first voltage converter (this element might be part of the second voltage converter). This element is configured to prevent, at least upon a condition, current flow from the output into the first voltage converter.

In case that both input voltages are present and the first or primary voltage at the first input is removed, the first voltage converter (fly-back converter) is still oscillating (operating) and its output behaves as an input. Current is flowing from the output of the second voltage converter into the first voltage converter. On the primary side (first input) of the first voltage converter, oscillations are still present. When connecting the first voltage again, it will not power up the first voltage converter because it is already active. A power source equipment (PSE), which powers a power device (PD, e.g., the camera), will not detect such PD and does not power up the input voltage of e.g., 48 VDC (a typical PSE delivers 48 to 55 VDC).

This is, in particular, only the case when the first voltage converter (fly-back converter) allows current flowing from the output into the second voltage converter. To solve this problem, the first voltage converter can be configured to stop operating when a voltage present at its input is decreased e.g. below a certain threshold or removed, preferably, when the first voltage source is disconnected. For example, an electrical element can be used to prevent current flowing into the second voltage converter, at least upon a certain condition. In particular, this element is a switch like a FET (field effect transistor, e.g., a MOSFET) and the circuit is configured to open the switch (and thus prevent current flow) when a voltage present at the input of the first voltage converter is below a threshold or removed, preferably, when the first voltage source is disconnected (this might be the mentioned condition). This can be achieved, for example, by decreasing the gate-source voltage of the FET (decreasing the input voltage then results in decreasing the gate-source voltage). After switching off (opening) the switch, the oscillations (operation) stop in the first voltage converter and the first voltage, if applied to the first input again, is able to start the first voltage converter up again. This specific switching operation of the FET prevents current flowing into the converter.

A diode can be used alternatively to a transistor. If a simple diode is used in the output path, the first voltage converter will immediately stop oscillating when the input voltage is removed. However, at high currents of about 2 A (which are typical currents flowing in such applications) the dissipation of a diode is quite large compared to the total power of the second voltage converter. A switch or FET allows decreasing that dissipation, although the converter keeps on oscillating when removing the input voltage. The reason why the converter (with a synchronous rectifying FET) keeps on oscillating when the output is connected to an external voltage of e.g. 5 V is inherent to a generic fly-back converter. As long as the fly-back controller receives a supply voltage, it keeps on generating pulses on the primary switch (switching FET). This is an undefined but stable state This awkward state prevents an input voltage like from PSE (Power Source Equipment) to start-up the fly-back converter again because it cannot detect a 25 kOhm resistance present.

The invention also relates to a use of such circuit with an electrical device like a (surveillance) camera, i.e., an application of such circuit. Such use comprises connecting the electrical device to the common output, connecting a primary voltage or power supply (like PoE) as the first voltage source to the first input and a back-up voltage source, preferably a battery, as the second voltage source to the second input.

Further advantages and embodiments of the invention will become apparent from the description and the appended figures.

BRIEF DESCRIPTION OF THE DRAWINGS

The invention is shown schematically in the figures on the basis of exemplary embodiments and will be described in the following, with reference to the figures.

DETAILED DESCRIPTION

Figure 1:
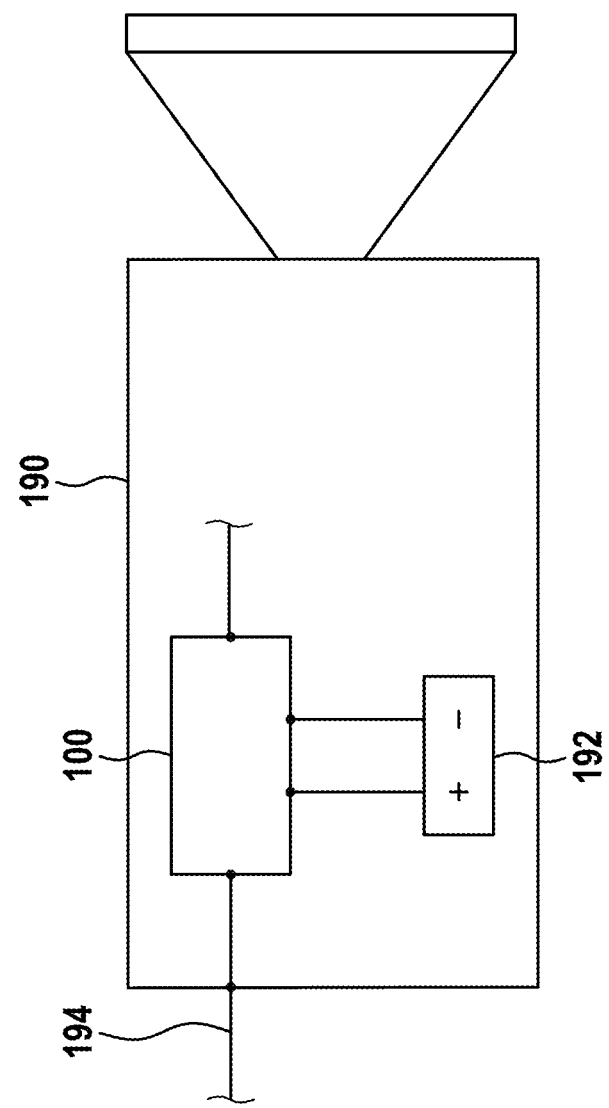
FIG. 1 shows a preferred use of a circuit according to the invention.

FIG. 1 schematically illustrates a preferred use of a circuit 100 in or with a surveillance camera 190. The surveillance camera 190 is connected via an Ethernet cable 194 to a network, wherein the Ethernet cable 194 is also used for power or voltage supply (PoE, Power over Ethernet) as a primary voltage supply. Further, a battery 192 is provided in the surveillance camera 190 as a back-up voltage supply in case the Ethernet cable 194 is disconnected. Both types of voltage supplies are connected to and combined via circuit 100 in order to eventually provide voltage to the surveillance camera.

Figure 2:
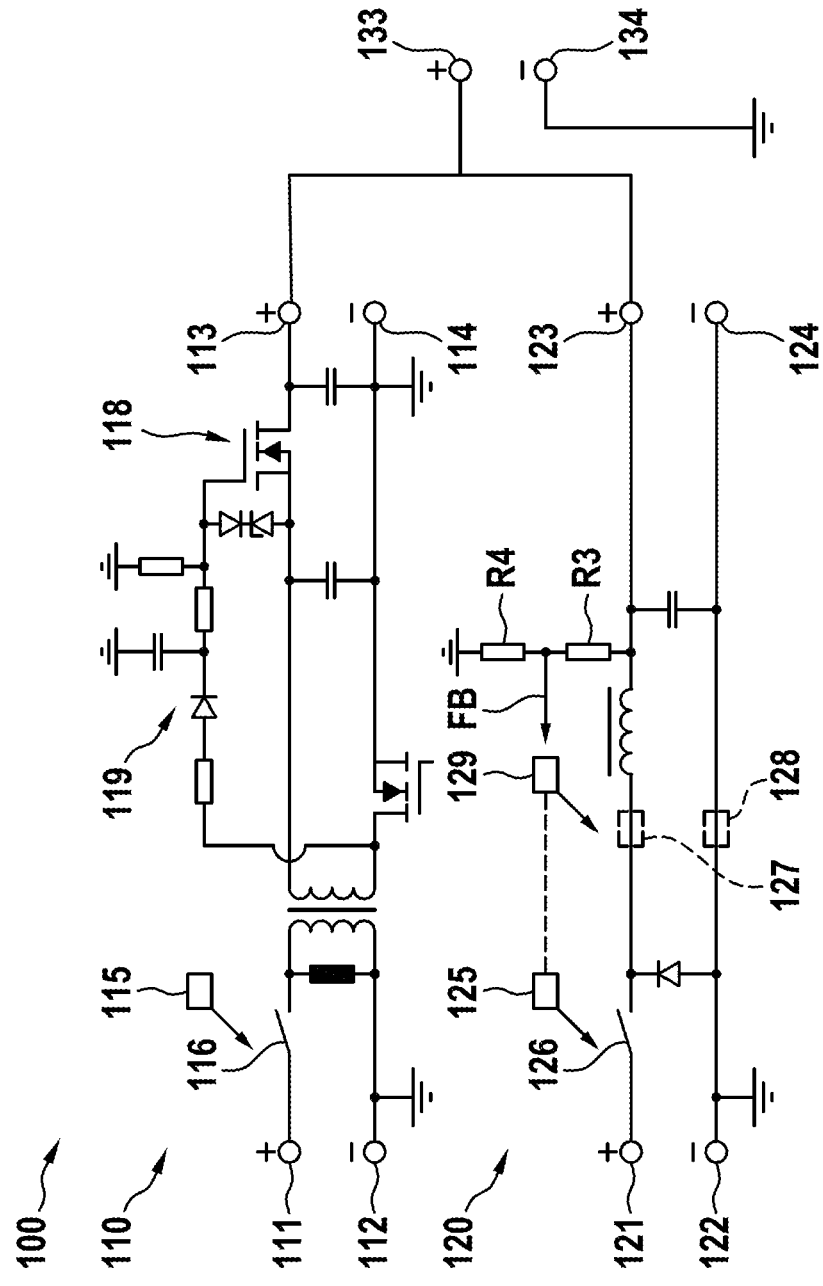
FIG. 2 shows a circuit according to the invention in a preferred embodiment.

FIG. 2 illustrates the circuit 100 of FIG. 1 in more detail. The circuit 100 comprises a first voltage converter 110 in the form of a fly-back converter, and second voltage converter 120 in the form of a buck converter.

The first voltage converter 110 comprises a positive input (or input contact) 111, a negative input 112, a positive output 113 and a negative output 114. Since the negative outputs are typically connected to ground, only the positive outputs (or their voltage potentials) are of relevance.

Further, the first voltage converter 110 comprises a transformer, a switch 116, and a controller 115 configured to open and close the switch 116. In this way, the first voltage converter 110 can be operated in order to convert a voltage supplied at the input 111 to a certain first voltage level $V_1$ at the output 113. In addition, a switch 118 in the form of a FET or MOSFET and a corresponding circuit 119 is provided upstream the output 113 which is used to prevent current flow from the output 113 into the first voltage converter 110 in case the voltage at the input 111 is removed.

Via the circuit 119 (peak detection circuit), a DC voltage (this level varies depending on the input voltage at input 111) is generated from the oscillating converter and supplied to the gate of FET 118. A high voltage level at that gate results in a conducting stage of FET 118, a low level disables the FET 118 (only its diode is used then). The peak detector circuit 119 is dimensioned in such a way that when the fly-back converter is in the awkward state of no input voltage and still oscillating, the output FET 118 is switched off.

The second voltage converter 120 comprises a positive input (or input contact) 121, a negative input 122, a positive output 123 and a negative output 124. Since the negative outputs are typically connected to ground, only the positive outputs (or their voltage potentials) are of relevance. Further, the second voltage converter 120 comprises an inductance, a diode, a switch 126 and a controller 125 configured to open and close the switch 126. In this way, the second voltage converter 120 can be operated in order to convert a voltage supplied at the input 121 to a certain second voltage level V2 at the output 123.

Further, the second voltage converter includes a feedback input (or pin) FB at which the output voltage present at the output 123 is fed back and can be measured or determined. With too high voltage at that feedback input FB, the output 123 may be disabled or switched off. For example, an internal error amplifier 129 (it might be part of the controller 125) is used to stop the controller 125 to generate pulses on the gates of the output FETs 127 and 128 (or 126).

The voltage level at feedback pin typically is between 0.89 V and 0.91 V. This voltage is defined by the controller. For example, the voltage on this feedback pin is 0.9 V with the current voltage level at output 123 at 5 V or whatever as an output voltage is required. By using the formula, $$R4 = \frac{R3 \cdot 0.9}{(V_{out} - 0.9)}$$

the output voltage $V_{out}$ can be set. R3 and R4 correspond to the values of the ohmic resistances shown in FIG. 2. The calculation is, for example, as follows: V(FB)=0.9V. The current through R4 (=22390 Ohm) is 0.9/22390=40.2 μA This same current of 40.2 μA is also flowing through R3 (=100 kOhm) so the voltage across R4 is 100k×40.2 uμ=4.02 V So the output voltage is V(FB)+4.02 V=0.9 V+4.02 V=4.92 VDC.

When the output voltage is pulled down (too much load), the controller will start to increase the duty-cycle to get more energy at the output. When the output voltage is pulled up, the buck-controller will start to decrease the duty-cycle to get rid of the high level of voltage at the output. If the output is too high, the buck-controller will shut down the energy to the buck inductor and stops oscillating.

The mentioned error amplifier can be used such that it knows what the output voltage is doing. It keeps the output stable independent of the load. The feedback pin monitors the output voltage and the internal error amplifier takes action when the output voltage is not correct.

Both (positive) outputs 113 and 123 are connected to each other and to a common (positive) output 133. Although not shown, the same might be the case for the negative outputs 114, 124 and 134 (these are connected to ground anyway). The input 111 of the first voltage converter 110 is then used as the first input of the entire circuit 100, the input 121 of the second voltage converter 120 is used as the second input of the entire circuit 100 and the common output 133 is the only output of the circuit 100 which is connected to the electrical device like the surveillance camera as shown in FIG. 1. The Ethernet cable shown in FIG. 1 serves as first or primary voltage supply and is connected to the first input 111; the battery shown in FIG. 1 servers as second or back-up voltage and is connected to the second input 121.

Figure 3:
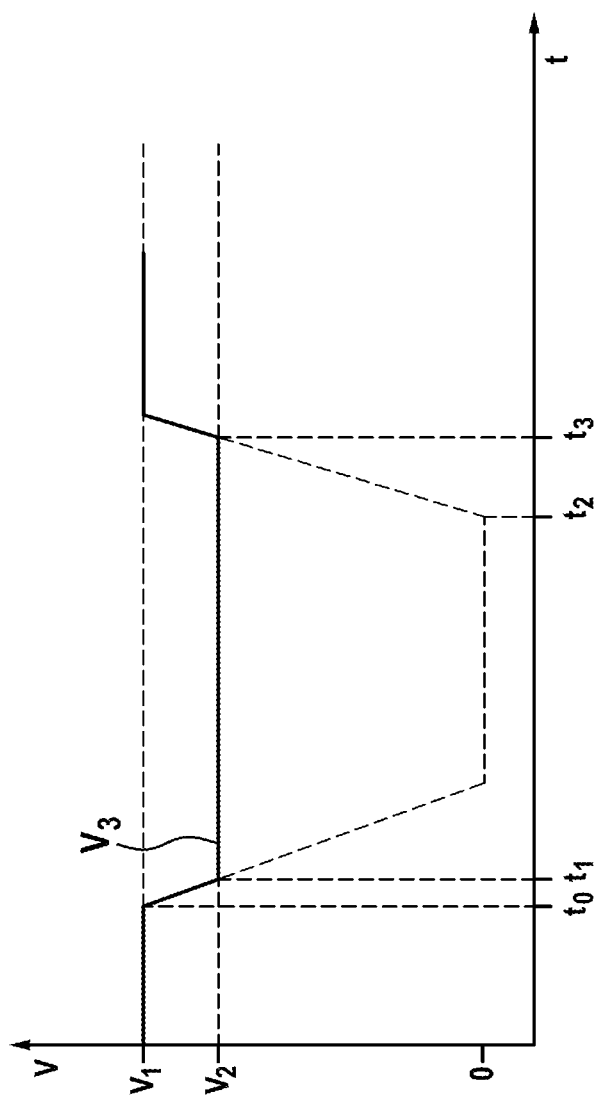
FIG. 3 shows voltage levels when operating a circuit according to the invention in a preferred embodiment.

FIG. 3 illustrates voltage levels in V present at the outputs of the first and second voltage converter as shown in FIG. 2 over time t when disconnecting and re-connecting the primary voltage supply while the back-up voltage supply is permanently connected. $V_1$ corresponds to the first voltage level provided at the output 113 of the first voltage converter 110 when the primary voltage supply is connected; the value might be, for example, $V_1$=5.1 V. $V_2$ corresponds to the second voltage level provided at the output 123 of the second voltage converter 120 when the back-up voltage supply is connected and the first voltage converter begin inactive; the value might be, for example, $V_1$=4.9 V. The current voltage level at the output 113 of the first voltage converter and the current voltage level at the output 123 of the second voltage converter are equal to the voltage level $V_3$ at the common output 133. Both start and stop thresholds are considered equal to the second voltage level $V_2$.

At the binning, with the first (primary) and second (back-up) voltage supply connected, the first voltage level $V_1$ pulls the current (output) voltage of the second voltage converter at the output 123—and also the common output—to the first voltage Level $V_1$, which is above the second voltage level $V_2$ and, thus also, the stop threshold: $V_3=V_1$. As mentioned earlier, this also means that the second voltage converter does not operate.

At time $t_0$, the first voltage supply is disconnected. Then, the voltage provided by the first voltage converter at its output decreases. At time t1, the voltage arrives at the second voltage level (stop threshold) $V_2$. This means that the second voltage converter immediately starts to operate to keep the output voltage—and thus also the voltage level $V_3$—at the second voltage level $V_2$. There will be no lower output voltage at the common output than $V_2$. Note that without the outputs 113 and 123 being connected, the voltage level at the output 113 would decrease to 0 as indicated with dashed line.

When the first or primary voltage supply is connected again at the time $t_3$, the voltage provided by the first voltage converter to its output 113 increasing from 0 (indicated with dashed line, note that due to the second voltage converter being operating, the voltage level at output 113 in fact is $V_2$). At time t4, the voltage provided by the first voltage converter to its output 113 reaches the second voltage level (start threshold) $V_2$ and the second voltage converter immediately stops operating. The output voltage and thus $V_3$ is still increasing to the first voltage level $V_1$.

The invention claimed is:

1. A circuit (100) for use in voltage supply for an electrical device (190), having a first input (111) configured for connecting with a first voltage source (194), a second input (121) configured for connecting with a second voltage source (192), and a common output (133) configured for connecting with an input of the electrical device (190), the circuit (100) comprising:
    a first voltage converter (110) with an input connected to the first input (111), and configured to provide DC voltage at a first voltage level (V1) at an output (113),
    a second voltage converter (120) with an input connected to the second input (121), and configured to provide DC voltage at a second voltage level (V2) at an output (123), wherein the output (113) of the first voltage converter (110) and the output (123) of the second voltage converter (120) both are connected to each other and to the common output (133), wherein the second voltage converter (120) is configured to stop providing the DC voltage at the second voltage level (V2) at the output (123) when a voltage level present at the output (123) of the second voltage converter (110) is higher than a stop threshold, and to provide the DC voltage at the second voltage level (V2) at the output (123) when the voltage level present at the output (123) of the second voltage converter (110) is lower than a start threshold.

2. The circuit (100) of claim 1, wherein the first voltage level (V1) is higher than the second voltage level (V2); and/or the stop threshold is equal to or higher than the second voltage level (V2) and lower than the first voltage level (V1); and/or the start threshold is equal to or lower than the stop threshold and/or the second voltage level (V2).

3. The circuit (100) of claim 1, wherein the first voltage converter (110) is configured to stop operating when a voltage present at the input (111) of the first voltage converter (111) decreases below a threshold.

4. The circuit (100) of claim 1, further comprising an electronic element (118) configured to prevent, at least upon a condition, current flow from the output (113) into the first voltage converter (110).

5. The circuit (100) of claim 4, wherein the electronic element (118) is a switch, and wherein the circuit is configured to open the switch when the voltage present at the input (111) of the first voltage converter decreases below the threshold.

6. The circuit (100) of claim 1, wherein the second voltage converter (120) is configured, to determine a current voltage level at its output (123).

7. The circuit (100) of claim 1, wherein the first voltage level (V1) is between 5.0 V and 5.3 V, and the second voltage level (V2) is between 4.7 V and 5.0 V, and/or wherein a difference between the first voltage level (V1) and the second voltage level (V2) higher than 0.1 V and/or equal to or lower than 0.5 V.

8. The circuit (100) of claim 1, wherein the first voltage converter (110) is a fly-back converter.

9. The circuit (100) of claim 1, wherein the second voltage converter (120) is a buck converter.

10. The circuit (100) of claim 1, wherein the first input (111) is configured for connection with Power-over-Ethernet as the first voltage source (194).

11. A method of using a circuit (100) with an electrical device (190), wherein the electrical device (190) includes a first input (111) configured to connect with a first voltage source (194), a second input (121) configured to connect with a second voltage source (192), and a common output (133),
    wherein the circuit (100) includes first voltage converter (110) with an input connected to the first input (111) and configured to provide DC voltage at a first voltage level (V1) at an output (113), a second voltage converter (120) with an input connected to the second input (121) and configured to provide DC voltage at a second voltage level (V2) at an output (123), wherein the output (113) of the first voltage converter (110) and the output (123) of the second voltage converter (120) both are connected to each other and to the common output (133), wherein the second voltage converter (120) is configured to stop providing the DC voltage at the second voltage level (V2) at the output (123) of the second voltage converter (120) when a voltage level present at the output (123) of the second voltage converter (120) is higher than a stop threshold, and to provide the DC voltage at the second voltage level (V2) at the output (123) of the second voltage converter (120) when the voltage level present at the output (123) of the second voltage converter (120) is lower than a start threshold,
    the method comprising:
    connecting the electrical device (190) to the common output (133), and
    connecting a primary voltage or power supply as the first voltage source (194) to the first input (111) and a back-up voltage source, as the second voltage source (192) to the second input (121).

12. The method as claims in claim 11, where in the electrical device 190 comprises a camera.

* * * * *